May 1, 1934.  F. J. LAPOINTE  1,956,988
HYDRAULICALLY CUSHIONED PISTON
Filed Nov. 5, 1929  2 Sheets-Sheet 1
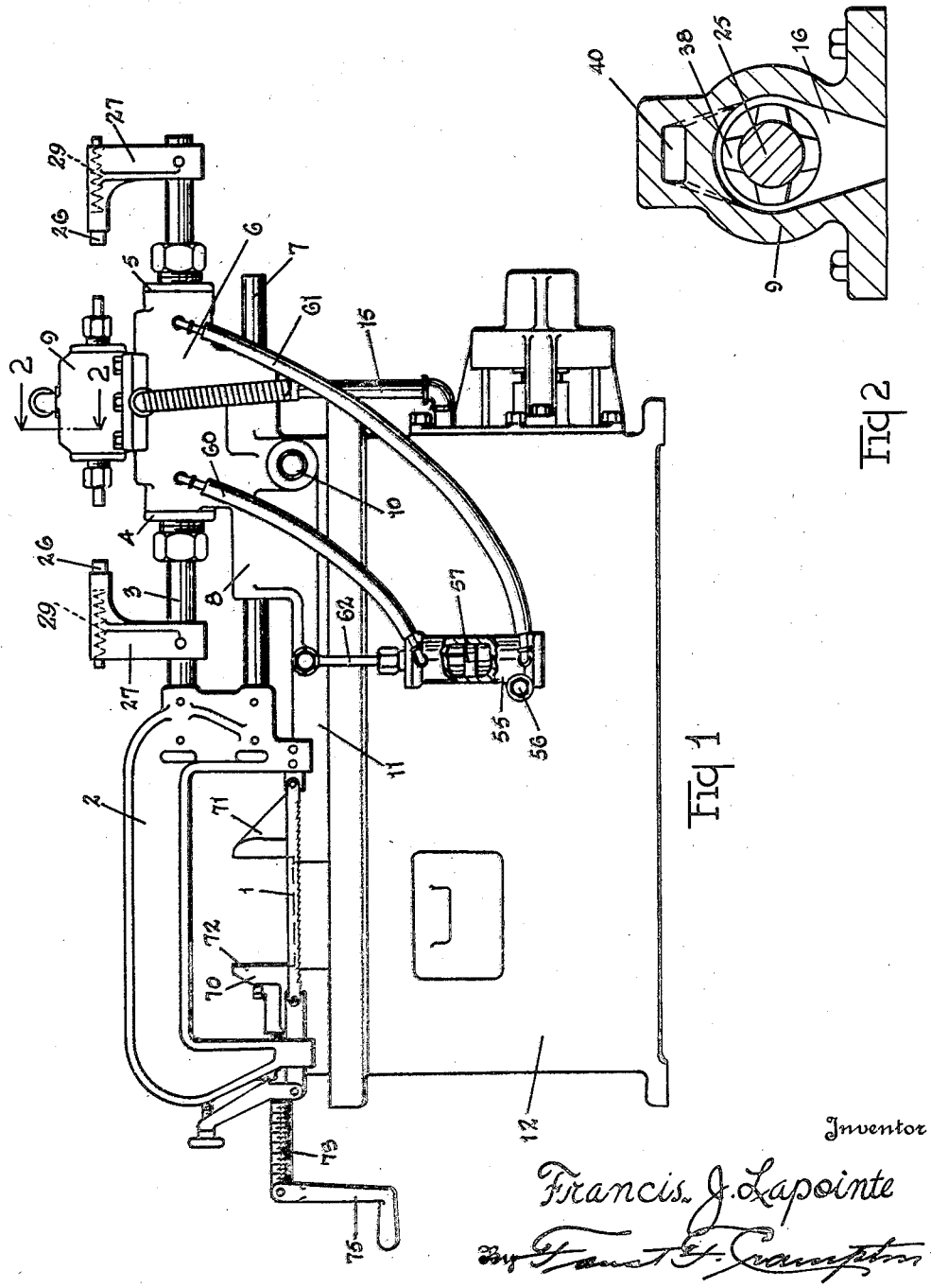
Inventor
Francis J. Lapointe
By
Attorney May 1, 1934.     F. J. LAPOINTE     1,956,988
HYDRAULICALLY CUSHIONED PISTON
Filed Nov. 5, 1929     2 Sheets-Sheet 2
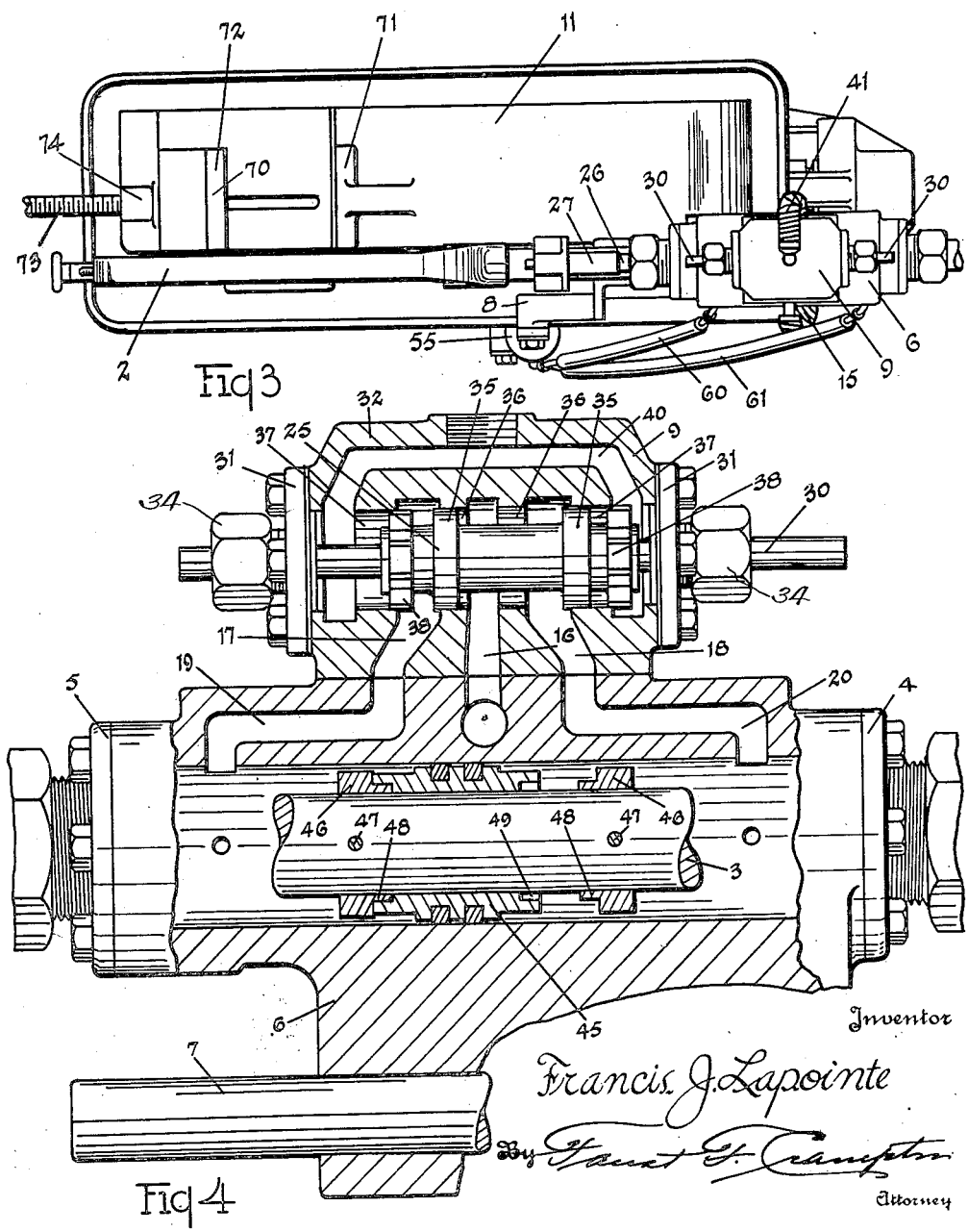

Patented May 1, 1934

1,956,988

UNITED STATES PATENT OFFICE 1,956,988

HYDRAULICALLY CUSHIONED PISTON

Francis J. Lapointe, Ann Arbor, Mich.

Application November 5, 1929, Serial No. 405,026

3 Claims. (Cl. 121—132)

My invention has for its object to provide an efficient hydraulic mechanism wherein all jerking or pounding of the parts of the mechanism is entirely eliminated.

The invention particularly has for its object to provide a hydraulic mechanism, having a hydraulic cushioning means, that will cushion the piston member where there is a considerable resistance of movement to the fluid or to the piston. The invention is particularly advantageous when the piston is used for hydraulically driving a tool or device that, from its characteristic structure, may be more advantageously operated reciprocally by a relatively slow initial and rapidly accelerated movements. Thus the invention is illustrated as applied to a hydraulically operated hack saw as illustrative of a practical application of the invention, the hack saw being of a character that damage may be done to the saw if its initial movement is the result of a shock or hammer that may be caused by a sudden reversal of movement at the points of reciprocations in the movements of the saw.

The invention may be contained in structures of different forms and, to illustrate a practical application of the invention, I have selected a power hack saw machine as an example of such structures and shall describe it hereinafter. The hack saw machine referred to is shown in the accompanying drawings.

Fig. 1 is a side view of the hack saw machine. Fig. 2 is a view of a section taken on the plane of the line 2—2 indicated in Fig. 1. Fig. 3 is a top view of the machine. Fig. 4 is a view of a vertical section through the hydraulic valve and pistons that operate the hack saw, looking towards the side of the machine illustrated in Fig. 1.

The hack saw blade 1 is supported in the hack saw frame 2 of the type well known in the art, and the frame 2 is connected to a piston rod 3 that extends through the heads 4 and 5 of a cylinder 6. A guide rod 7 is also connected to the hack saw frame 2. The guide rod 7 extends through a hack saw supporting frame 8 for the purpose of maintaining the hack saw in the desired plane with reference to the work that is to be sawed. The cylinder 6 and a controlling valve 9 are supported on the hack saw supporting frame 8. The hack saw supporting frame 8 is pivotally supported on a pin 10 which is supported in the bed 11 of the hack saw machine. The bed 11 is supported on a suitable frame 12 which contains a suitable source of supply of a liquid under pressure. Preferably, oil is used for the transmission of power that may be produced by a gear pump operated by an electric motor. The gear pump and the motor may be of any form well known in the art.

The oil is directed from the source of supply through the pipe 15 to the valve 9 and through the passageway 16 and through one or the other of the passageways 17 or 18, depending on the position of the controlling valve. The passageways 17 and 18 of the valve 9 communicate with the ends of the cylinder 6 through the passageways 19 and 20.

The movable member 25 of the valve 9 is reciprocally and intermittently operated by means of the pins 26 that are secured to the piston rod 3 at points on opposite sides of the cylinder 6 by means of the brackets 27. If desired the pins 26 may be spring pressed by the springs 29 to insure complete movement of the member 25 from one end of the valve casing to the other. The movable member 25 is provided with a rod 30 which extends through the housing 32 of the valve 9 and is connected to the movable member of the valve. The housing 32 of the valve 9 is provided with suitable heads or end plates 31 and the rod 30 is surrounded by suitable packing nuts 34 for preventing leakage of the oil that passes through the housing. The movable member 25 of the valve is provided with a pair of sealing ribs 35 that fit the sealing ledges 36 and 37 formed in the valve housing 32. Suitable spiders 38 are formed at the ends of the movable member 25 and are slidably supported on the surfaces of the ridges 37. The spiders permit the exhaust of the liquid from the cylinder 6 to the passageway 40, which communicates with either end of the cylinder 6 through the passageways 17 and 19, or the passageways 18 and 20, according to the position of the movable member 25. The passageway 40 also communicates with the source of supply of the liquid through the pipe 41. The pipe 41 provides for the return of the liquid to the source of supply.

In the operation of the saw, the spring pressed pins 26 alternately strike the ends of the rod 30 to shift the movable member 25 of the valve 9 to alternately direct the fluid under pressure into the opposite ends of the cylinder 6 and to exhaust the liquid from the end other than the one to which the liquid under pressure is directed. This produces the reciprocatory movements of the saw and intermittent movements of the valve member 25.

The piston 45 is slidably supported on the piston rod 3 within certain limitations. The piston is limited in its movement relative to the piston rod by a pair of members that are so constructed as to cushion the piston hydraulically when it reaches points near the limits of its movement. A pair of rings or collars 46 are secured to the piston rod 3 by the pins 47. The rings or collars 46 have cylindrical flanges 48 that substantially fit recesses 49 formed within the ends of the piston 45 whereby a cylindrical flange 48 of one or the other of the rings or collars 46 will enter one of the recesses 49. In view of the fact that the cylindrical flanges 48 fit the recesses 49, except for .002 or .003 clearance, the oil will be trapped within the one or the other of the recesses 49 and will be allowed to gradually move therefrom. The recesses 49 and the flanges or cylindrical portions 48 form hydraulic buffers or cushions located in opposite ends of the piston 45 for gradually transmitting the movement of the piston to the piston rod 3. This eliminates all clacking and pounding and jerking that would otherwise be caused by the quick change in pressure of the fluid within the cylinder, brought about by the quick change of position of the valve.

The pressure of the saw on the work is, moreover, controlled by the pressure that is built up in the cylinder 6 in the operation of the saw. The pivoted saw supporting frame 8 is alternately drawn down and the pressure released by means of the piston 57 and cylinder 55. The cylinder 55 is pivotally supported by means of the pin 56 which is connected to the frame 12 of the machine. A small pipe 60, connects one end of the cylinder 55 with one end of the cylinder 6 and a small pipe 61, connects the opposite end of the cylinder 55 with the remaining end of the cylinder 6, with the result that when the pressure is on the forward side of the piston 45, the pressure is transmitted through the pipe 60 that communicates with the cylinder 55 at a point above the piston. The piston 57 is connected to the saw supporting frame 8 by means of the piston rod 62. Consequently, if there is a considerable resistance to the movement of the saw 1, the piston 45 will move slower, which will increase the pressure within the cylinder 55 and cause the saw 1 to be drawn down with a greater pressure against the work, while, if the work resists the movement of the saw blade to a lesser extent, the pressure on the saw blade will be less, which will prevent too rapid cutting or digging of the saw blade into the work. On the return stroke, the pressure will be transmitted from the rear end of the cylinder through the pipe 61 to a lower end of the cylinder 55 and cause a release of the pressure of the saw blade on the work. In the return stroke, there will be less resistance to the saw blade 1 and, consequently, the piston 45 will move comparatively quite freely and, the pressure transmitted through the pipe 61 will further release the saw blade 1.

Any suitable vise 70 may be used for clamping the work in position. A fixed vise jaw 71 may be connected to the bed 11 and a movable vise jaw 72 may be operated by a suitable screw 73 that extends through a bracket 74 located on the bed 11. Rotation of the screw 73, as by the crank 75, operates to clamp the work between the vise jaws 71 and 72.

I claim:

1. In a motor operated by liquid pressure, a cylinder, a piston rod, a piston slidably movable on the piston rod and fitting the inside surface of the cylinder, means for intermittently admitting fluid to either side of the piston, a pair of members secured to the piston rod on opposite sides of the piston, the opposite ends of the piston and the contiguous ends of the members having substantially interfitting protruding parts and sockets therefor, for the entrapment of portions of the liquid and subsequent escapement therefrom, thereby cushioning the shock upon the piston due to the sudden reversal of pressure in the cylinder.

2. In a hydraulically operated mechanism, a source of fluid under pressure, a cylinder, means for alternately connecting opposite ends of the cylinder with the said source of fluid under pressure, a piston rod located in the cylinder and movable therethrough, a pair of collars keyed to the piston rod, a piston slidably mounted on the piston rod between the said pair of collars, the peripheral surfaces of the collars and the wall of the cylinder forming annular openings of small cross section resistant to the free movement of the hydraulic medium from between the piston and the collars, an annular recess formed in each end of the piston, a shoulder formed on each of the pair of collars and extending toward the piston, whereby upon movement of the piston relative to a collar the shoulder will displace the liquid within the recess on the leading side of the piston to cushion the force of impact of the impressed liquid on the following side of the piston immediately before the piston engages the collar.

3. In a hydraulic mechanism, a source of supply of fluid, a cylinder connected to the said source at opposite ends thereof, a piston rod located in the cylinder, a pair of collars secured to the piston rod, a piston slidably mounted on the piston rod between the said collars, means for admitting fluid to either side of the piston, the opposed surfaces of the said piston and the said collars having substantially interfitting protruding parts and sockets therefor for the entrapment of portions of the liquid and subsequent escapement therefrom, thereby hydraulically cushioning a shock upon the piston and piston rod due to reversal of pressure in the cylinder.

FRANCIS J. LAPOINTE.